United States Patent [19]

Zscheile, Jr. et al.

[11] 4,225,935
[45] Sep. 30, 1980

[54] CODING METHOD AND SYSTEM WITH ENHANCED SECURITY

[75] Inventors: John W. Zscheile, Jr., Murray; Billie M. Spencer, Bountiful, both of Utah

[73] Assignee: Sperry Corporation, New York, N.Y.

[21] Appl. No.: 830,274

[22] Filed: Aug. 30, 1977

[51] Int. Cl.$^2$ .............................................. G06F 1/02
[52] U.S. Cl. ...................... 364/717; 178/22; 375/1
[58] Field of Search ............ 364/717; 325/32; 331/78; 178/22

[56] References Cited

U.S. PATENT DOCUMENTS

| | | | |
|---|---|---|---|
| 3,728,529 | 4/1973 | Kartchner | 364/717 |
| 3,761,696 | 9/1973 | Russell | 331/78 |
| 3,796,830 | 3/1974 | Smith | 178/22 |
| 3,983,326 | 9/1976 | Gannett | 178/22 |
| 4,032,763 | 6/1977 | Glitz | 331/78 |

*Primary Examiner*—Howard A. Birmiel
*Attorney, Agent, or Firm*—John P. Dority; William E. Cleaver; Marshall M. Truex

[57] ABSTRACT

A coding system produces a code with enhanced acquisition security by generating a plurality of linear component codes, $C_1, C_2, \ldots C_n$, combining the component codes in accordance with a modulo-2 addition rule to form a linear first composite code, nonlinearizing the first composite code to form a nonlinear second composite code, time delaying the component codes, $C_1, C_2, \ldots C_{n-1}$, and combining the time delayed codes with the nonlinear second composite code in accordance with a Boolean majority voting rule to form a nonlinear acquisition composite code. Acquisition of the nonlinear acquisition composite code is achieved by generating a plurality of linear reference component codes, $R_1, R_2, \ldots R_n$, that correlate respectively with the linear acquisition component codes, $C_1, C_2, \ldots C_n$, combining the reference component codes in accordance with the modulo-2 addition rule to form a linear third composite code, nonlinearizing the third composite code to form a nonlinear fourth composite code, time delaying the reference component codes, $R_1, R_2, \ldots R_{n-1}$, correlating the time delayed codes with the nonlinear acquisition composite code by shifting the phases of the time delayed codes, and correlating the fourth composite code with the acquisition composite code by shifting the phase of the reference component code, $R_n$.

12 Claims, 4 Drawing Figures

CODING METHOD AND SYSTEM WITH ENHANCED SECURITY

CROSS REFERENCE TO RELATED APPLICATION

Reference is hereby made to the following co-pending U.S. application dealing with related subject matter and assigned to the assignee of the present invention: "A System for the Secure and Rapid Acquisition of Composite Code Signals" by Earl M. Kartchner et al, U.S. Ser. No. 65,040, filed Aug. 19, 1970.

BACKGROUND OF THE INVENTION

1. Field of the Invention

The present invention relates generally to spread spectrum communication systems and, more particularly, is concerned with a method and system for nonlinearizing spread spectrum codes for enhanced system security while still maintaining rapid acquisition thereof.

2. Description of the Prior Art

The present invention constitutes an improvement upon the system described and illustrated in the above cross-referenced U.S. patent application.

The system of the referenced application utilizes, by way of example, a plurality of linear PN component codes, $C_1, C_2, \ldots C_n$, which are all relatively prime with respect to each other, have an approximately equal number of binary ONES and ZEROES, and, with respect to linear MAJ and MOD composites thereof, possess the following correlation properties:

(1) $C_1, C_2, \ldots$ and $C_n$ each correlates with MAJ $(C_1, C_2, \ldots C_n)$ fifty percent of the time.

(2) $C_1, C_2, \ldots$ and $C_n$ each does not correlate with MOD $(C_1, C_2, \ldots C_n)$.

(3) MAJ $(C_1, C_2, \ldots C_n)$ correlates with MOD $(C_1, C_2, \ldots C_n)$ fifty percent of the time.

MAJ $(C_1, C_2, \ldots C_n)$ equals a Boolean majority vote of $C_1, C_2, \ldots$ and $C_n$.

MOD $(C_1, C_2, \ldots C_n)$ equals a modulo-2 addition of $C_1, C_2, \ldots$ and $C_n$.

The chronological sequence of events carried out for achieving rapid code acquisition by the prior art system may be summarized as follows:

(1) Linear component codes, $C_1, C_2, \ldots C_n$, are generated.

(2) $C_1, C_2, \ldots C_n$ are combined in accordance with the Boolean majority voting rule to form a linear acquisition composite code, MAJ $(C_1, C_2, \ldots C_n)$.

(3) The acquisition composite code is transmitted.

(4) Upon receipt of the acquisition composite code, linear reference component codes, $R_1, R_2, \ldots R_n$ which correlate respectively with $C_1, C_2, \ldots C_n$, are generated.

(5) First, $R_1$ is correlated with MAJ $(C_1, C_2, \ldots C_n)$; then $R_2$ is correlated with MAJ $(C_1, C_2, \ldots C_n)$; finally, $R_n$ is correlated with MAJ $(C_1, C_2, \ldots C_n)$.

For the transmission and receipt of data, the following chronological sequence of events is carried out by the prior art system:

(1) Linear reference component codes, $R_1, R_2, \ldots R_n$, are combined in accordance with the modulo-2 addition rule to form a linear reference composite code, MOD $(R_1, R_2, \ldots R_n)$.

(2) MOD $(R_1, R_2, \ldots R_n)$ is then correlated with acquisition composite code MAJ $(C_1, C_2, \ldots C_n)$.

(3) Linear composite codes, $C_1, C_2, \ldots C_n$, are then combined in accordance with the modulo-2 addition rule to form a linear data-carrying composite code, MOD $(C_1, C_2, \ldots C_n)$.

(4) The data-carrying composite code is then transmitted, instead of the acquisition composite code.

(5) At the receiver, MOD $(R_1, R_2, \ldots R_n)$ now correlates with MOD $(C_1, C_2, \ldots C_n)$.

The above-described sequence of events implies that the total number of code bits required to be searched for acquisition of the transmitted composite code is equal to the sum of the individual lengths of the component codes which form the composite code, rather than the product of their lengths. Consequently, it is readily appreciated that acquisition under the prior art system is rapid, thereby leaving little time for an intelligent jammer to analyze the linear composite code MAJ $(C_1, C_2, \ldots C_n)$, which is transmitted for acquisition, in order to determine component codes, $C_1, C_2, \ldots C_n$.

Also, the jammer must have knowledge of all of the component codes and their phase relationship with respect to each other in order to jam MOD $(C_1, C_2, \ldots C_n)$ which is used for data transmission, since none of the component codes correlate with MOD $(C_1, C_2, \ldots C_n)$.

However, under field conditions where the jammer is capable of intercepting the transmission of MOD $(C_1, C_2, \ldots C_n)$, the latter is vulnerable to discovery through analysis by the jammer since it is a linear sequence. By using a computer to perform well known mathmatical calculations at high speed, the polynomial equation which mathematically represents the intercepted linear composite code can be determined and a replica thereof constructed. Therefore, while the overall sequence of events carried out by the prior art system increases the difficulty of code analysis by an enemy, it does not preclude such analysis under certain field conditions in view of the fact that the component codes and the composites thereof being utilized by the prior art system are all linear sequences.

SUMMARY OF THE INVENTION

In accordance with the principles of the present invention, certain important modifications are made to the prior art system which result in an improved system being essentially invulnerable to enemy analysis. The above-summarized correlation properties of the prior art system and its concomitant rapid acquisition capability are maintained in the improved system of the present invention, while the likelihood of successful analysis by an enemy of the codes produced by the improved system is made infinitesimally small.

The same basic component codes, $C_1, C_2, \ldots C_n$ and $R_1, R_2, \ldots R_n$, as utilized in the prior art system, are utilized by the improved system during the initial steps in the production of composite codes and in the later acquisition thereof, respectively. However, means in the form of an encrypter running in the decrypt mode is incorporated by the improved system in a manner which insures that the MAJ and MOD composite codes produced are both nonlinear, have the appearance of being of infinite length, and, consequently, are essentially nonanalyzable. Furthermore, the component code, $C_n$, is not transmitted as a correlatable component of the MAJ acquisition composite code; therefore, the sequence of component codes, $C_1, C_2, \ldots C_n$, which drives the encrypter cannot be determined by analysis of the MAJ composite code even if component codes, $C_1, C_2, \ldots C_{n-1}$, become known by an enemy. Still further, the sequence of component codes, $C_1, C_2, \ldots C_{n-1}$, which goes into the formation of the MAJ and MOD composite codes is time delayed relative to the sequence thereof which is utilized in the driving of the encrypter in the decrypt mode. This delay time is nonanalyzable by an enemy.

Accordingly, the present invention broadly relates to a method of producing a code with enhanced acquisition security, and a system incorporating means for producing the same, wherein the steps carried out comprise: (a) generating a plurality of linear component codes, $C_1, C_2, \ldots C_n$; (b) combining the linear component codes to form a linear first composite code in accordance with a first composite rule of such a character that the first composite code does not correlate with the component codes; (c) nonlinearizing the first composite code to form a nonlinear second composite code; and (d) combining the linear component codes, $C_1, C_2, \ldots C_{n-1}$, with the nonlinear second composite code to form a nonlinear acquisition composite code in accordance with a second composition rule of such a character that at least one of the component codes correlates with the acquisition composite code. The first composition rule is a modulo-2 addition rule and the second composition rule is a Boolean majority voting rule.

More particularly, the nonlinearizing step comprises applying the linear first composite code to an encrypter operating in a decrypt mode to form the nonlinear second composite code. Further, the (d) combining step comprises time delaying component codes, $C_1, C_2, \ldots C_{n-1}$, and then combining the delayed codes with the nonlinear second composite code to form the nonlinear acquisition composite code in accordance with the Boolean majority voting rule.

The present invention also relates to a coding method for communication between a transmitter and a receiver with enhanced security. At the transmitter, the above-outlined (a) through (d) steps are performed for producing the nonlinear acquisition composite code, followed by (e) transmitting the acquisition code. At the receiver, the following steps are performed for acquiring the acquisition code: (a) receiving the nonlinear acquisition composite code; (b) generating a plurality of linear reference component codes, $R_1, R_2, \ldots R_n$, that correlate respectively with the acquisition component codes, $C_1, C_2, \ldots C_n$; (c) combining the reference component codes to form a linear third composite code in accordance with the first composition rule; (d) nonlinearizing in a manner identical to the same step performed at the transmitter the third composite code to form a nonlinear fourth composite code; (e) correlating the reference component codes, $R_1, R_2, \ldots R_{n-1}$, with the nonlinear acquisition composite code by shifting the phases of the component codes; and (f) correlating the nonlinear fourth composite code with the nonlinear acquisition code by shifting the phase of the remaining component code, $R_n$. The (e) correlating step comprises time delaying the reference components, $R_1, R_2, \ldots R_{n-1}$, by the same amount that $C_1, C_2, \ldots C_{n-1}$ were time delayed at the transmitter and correlating the time delayed codes with the nonlinear acquisition composite code by shifting the phases of the time delayed codes, $R_1, R_2, \ldots R_{n-1}$.

DETAILED DESCRIPTION OF THE INVENTION

Introduction

Figure 1:
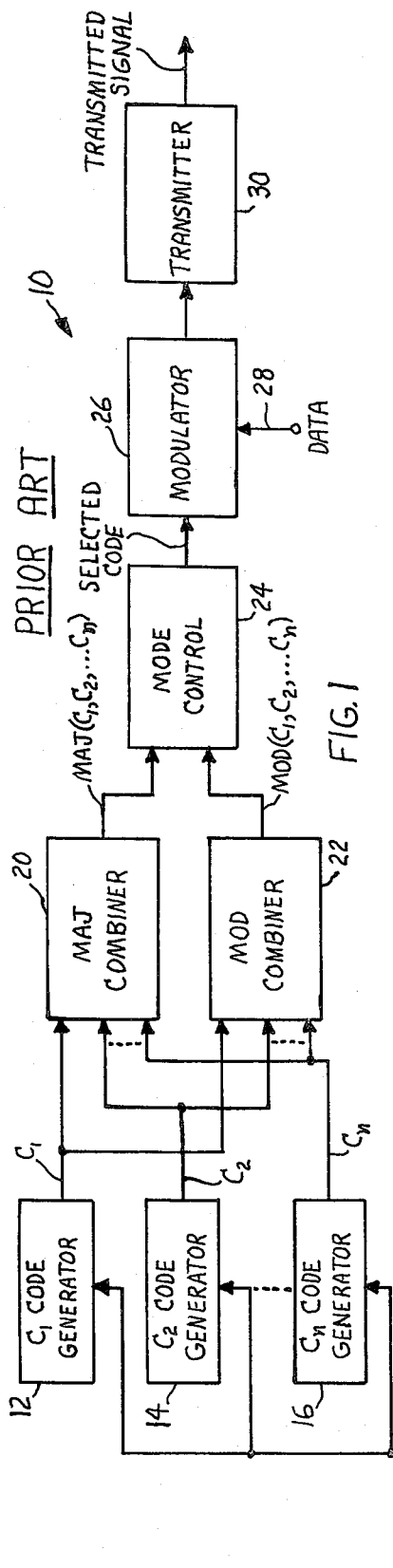
FIG. 1 is a block schematic diagram of the transmitting portion of the prior art data communication system.

The present invention may be best understood through an explanation of the improvements it makes to the prior art system. Therefore, in the following detailed description, the prior art system as illustrated in FIGS. 1 and 3 will first be described, keeping in mind that for a more complete description thereof attention should be directed to the above-referenced U.S. patent application. Then, the modifications made to the prior art system will be described with reference to FIGS. 2 and 4.

Prior Art System

Referring now to FIG. 1, there is illustrated the transmitting portion of the prior art data communication system, generally designated 10. The system 10 includes a plurality of acquisition component code generators 12, 14 and 16 for generating a plurality of component codes, $C_1, C_2, \ldots C_n$, respectively, which may, for example, be binary state pseudorandom codes. Ideally, the codes should possess the following properties:
(1) the cyclic lengths of the codes should be relatively prime with respect to each other;
(2) the codes should possess substantially ideal autocorrelation functions; and
(3) the codes should be balanced, i.e., each cycle should include approximately equal numbers of binary ONES and ZEROES.

The cyclic code lengths are said to be relatively prime with respect to each other if there exists no integer other than unity that divides more than one of the respective lengths of the codes, that is, they have no common factors. An autocorrelation function is said to be ideal when it possesses a correlation peak of substantial magnitude and has no significant side lobes. The acquisition code generators 12, 14 and 16 may be of the conventional shift register type that provides pseudorandom codes of the linear maximal length variety.

The system 10 also includes a clock source 18 which provides the timing signals for the acquisition component code generators 12, 14 and 16 such that all of the codes are provided at the same clock rate and have the same bit intervals in time. It is understood that the relative bit phases of the codes provided by the generators 12, 14 and 16 may be adjusted by means that, for the sake of clarity, are not shown.

The pseudorandom binary codes, $C_1, C_2, \ldots C_n$, provided by the component code generators 12, 14 and 16 are applied as inputs to a MAJ combiner 20 of the system 10. The MAJ combiner 20 combines the bits of the component codes in accordance with a conventional Boolean majority logic voting rule thereby providing a linear composite code hereinafter referred to as the MAJ composite code for convenience. The output of the MAJ combiner 20 is a binary ZERO during a bit interval if, in the bit interval, half or more than half of the component codes are binary ZERO. The output of the MAJ combiner 20 is binary ONE during the bit interval if more than half of the component codes are binary ONE. The MAJ composite code may be utilized as an acquisition composite code in the system 10. It is understood that the MAJ combiner 20 may comprise conventional binary majority voting circuits of a type well known in the digital electronics art.

As well as being provided as inputs to the MAJ combiner 20, the pseudorandom binary acquisition component codes, $C_1$, $C_2$, ... $C_n$, are also applied as inputs to a MOD combiner 22 of the system 10. The MOD combiner 22 combines the bits of the component codes in accordance with a conventional modulo-2 addition rule thereby providing a linear composite code hereinafter referred to as the MOD composite code for convenience. The MOD combiner output is ZERO when the number of binary ONES being summed in a bit interval is even, and the MOD combiner output is ONE when the number of binary ONES being summed in a bit interval is odd. It is understood that the MOD combiner 22 may comprise a conventional binary arithmetic circuit of a type well known in the digital electronics art. The MOD composite code may be utilized as a verification composite code or as a data carrier composite code in the system 10.

The MAJ and MOD composite codes from the combiners 20, 22, respectively, are applied as inputs to a mode control 24 of the system 10. The mode control 24 provides as its output either the MAJ composite code or the MOD composite code selected in accordance with the mode in which the system 10 is operating. The selected composite code from the mode control 24 is applied as an input to a modulator 26 of the system 10. An input 28 to the modulator 26 provides a data signal which may modulate the selected composite code in any convenient manner.

The selected composite code passing through the modulator 26 is applied as an input to a transmitter 30 of the system 10. The transmitter 30 may provide the selected code for transmission in a conventional manner. The output provided by the transmitter 30 is transmitted for receipt by the receiving portion of the system illustrated in FIG. 3.

Turning to FIG. 3, the output transmitted by transmitter 30 of FIG. 1 is received by a conventional receiver 32 of the system 10. The receiver 32 processes the received signal in a conventional manner and its output is applied as a common input to a number of correlators 34 of the system 10. Other inputs to the correlators 34 are applied from a mode control 36 in a manner to be explained.

The receiving portion of the prior art system 10 also includes a plurality of reference component code generators 38, 40 and 42 which may be identical to acquisition component code generators 12, 14 and 16 of FIG. 1. The reference generators 38, 40 and 42 generate a plurality of linear reference component codes, $R_1$, $R_2$, ... $R_n$, respectively, which may, for example, be binary state pseudorandom codes and are preferably identical respectively to linear acquisition component codes, $C_1$, $C_2$, ... $C_n$, for optimum performance of the system 10. However, it is to be understood that the reference component codes need only correlate with the acquisition component codes and not be identical therewith. While only three acquisition component code generators and three reference component code generators are illustrated, it should be understood that the pluralities thereof may include greater than three generators and that an acquisition generator and a reference generator for respectively providing acquisition component code $C_{n-1}$ and reference component code $R_{n-1}$ are assumed to be present in the system 10 without illustration of the same.

The reference component code generators 38, 40 and 42 are driven by a clock source 44 of the system 10. The clock source 44 provides clock signals to the reference component code generators 38, 40 and 42 so that the component codes are provided at the same clock rate with respect to each other and have identical bit intervals. The clock source 44, in addition, includes circuits to continuously and simultaneously adjust the phases of the clock signals provided to the generators 38, 40 and 42 so that the component codes generated thereby may together be stepped in time. The clock source 44 may, additionally, include circuits to delete, one at a time, clock pulses from any one of the clock signals going to the component code generators so that the component code provided by the generator associated therewith may be stepped one bit interval at a time past the received signal for reasons to be discussed later. The clock source 44 receives a signal from the mode control 36 to control the described functions in a manner to be explained later. The circuits of the clock source 44 may be of any conventional design of a type well known to those skilled in the art.

The reference component codes, $R_1$, $R_2$, ... $R_n$, provided by the respective generators 38, 40 and 42 are combined in MAJ and MOD combiners 46 and 48 in a manner identical to that described with respect to FIG. 1, thus providing linear MAJ and MOD reference composite codes respectively.

The individual reference component codes, $R_1$, $R_2$, ... $R_n$, as well as the MAJ and MOD composite codes are provided as inputs to the mode control 36. The mode control 36 selects, in a conventional manner, one or more of the codes for application to the correlators 34, for reasons to be explained later. The mode control 36, in addition, selects the particular ones of the correlators 34 to be utilized in accordance with the operational mode of the system 10.

The outputs of the correlators 34 are applied as inputs to respective threshold detectors 50 of the system 10. The threshold detectors 50 are conventional circuits that provide signals, respectively, whenever the respectively applied correlation signals exceed respective predetermined thresholds. The outputs of the threshold detector 50 are applied as inputs to the mode control 36 for reasons to be discussed later.

The output signal from one of the correlators 34, selected by the mode control 36, is provided as an input to a code tracking circuit 52 of the system 10. The code tracking circuit 52 is utilized to track the peak of the correlation function provided by the selected correlator. The circuit 52 may comprise a conventional phase locked loop which may conveniently be instrumented as a dither modulator/demodulator of a conventional type. The output of the code tracking circuit 52 is applied as an input to the clock source 44 to adjust the phases of the clock signals for the purpose of tracking the correlation peaks during the various operational modes of the system 10 to be described hereinafter.

The output of the same or another selected one of the correlators 34 is also applied as an input to a data demodulator 53 of the system 10. The data demodulator 53 is a conventional circuit that demodulates the data modulated code carrier signal, thereby providing a signal representative of the data impressed on the code carrier by the modulator 26 of FIG. 1.

In the following description of the operation of the data communication system 10 illustrated in FIGS. 1 and 3, the acquisition mode of the system will first be discussed. The acquisition component code generators 12, 14 and 16 are set to generate respective predetermined component codes, $C_1, C_2, \ldots C_n$, and the relative phases thereof are adjusted in accordance with a predetermined pattern. The mode control 24 is adjusted to select the MAJ composite code for transmission by the transmitter 30 as the acquisition composite code.

The receiver 32 of FIG. 3 then receives the transmitted acquisition composite code. The reference component code generators 38, 40 and 42 are adjusted to generate reference component codes, $R_1, R_2, \ldots R_n$, in the same sequence pattern as that of the acquisition component codes, $C_1, C_2, \ldots C_n$.

The mode control 36 selects one of the reference component codes, for example $R_1$, for application to a selected one of the correlators 34 for correlation matching with the received signal, MAJ composite code. The mode control 36 controls the clock source 44 so that the phase of the reference component code $R_1$ is continuously swept past the received signal, MAJ ($C_1, C_2, \ldots C_n$) composite code, until the selected one of the correlators 34 indicates a correlation peak by means of the associated one of the threshold detectors 50. The mode control 36, in response to the detected correlation peaks, stops the time sweep of the reference component code $R_1$. The output of the selected one of the correlators 34 is utilized, via the code tracking circuit 52, to maintain the proper adjustment of the clock source 44 so that the correlation peak of the reference component code $R_1$ with respect to the incoming signal is tracked. Thus, the code tracking circuit 52 locks onto the peak of this correlation function adjusting the clock source 44 to maintain the reference component code $R_1$ aligned with the incoming signal. Since the remaining reference component codes are generated in bit synchronism with the reference component code $R_1$, the remaining codes are now in bit synchronism with the incoming signal, MAJ composite code, although not necessarily aligned at their respective correlation peaks. The reference component code $R_1$ has now been acquired with respect to the received or incoming signal.

The mode control 36 now selects a second one of the correlators 34 and applies a second reference component code, for example $R_2$, thereto for correlation with the received signal. Reference component code $R_2$ is stepped one bit at a time until the selected one of the correlators 34 manifests a correlation peak as detected by the associated one of the threshold detectors 50. The mode control 36 then stops the stepping of code $R_2$. The remaining reference component codes are aligned with the received signal, MAJ composite code, in a similar manner and acquisition of MAJ composite code is achieved. It should be understood that the component codes may be selected serially as described above, or in parallel which means all codes are selected and correlated with the MAJ acquisition composite code simultaneously.

In order to verify the successful acquisition of the MAJ acquisition composite code transmitted by the transmitter 30, the mode control 36 of the receiving portion of the system 10 applies the output of the MOD combiner 48 to a selected one of the correlators 34 for correlation of MOD ($R_1, R_2, \ldots R_n$) reference composite code with the incoming MAJ ($C_1, C_2, \ldots C_n$) acquisition composite code. Only if all of the reference component codes, $R_1, R_2, \ldots R_n$, are in proper alignment with the respective acquisition component codes, $C_1, C_2, \ldots C_n$, of the transmitted MAJ ($C_1, C_2, \ldots C_n$) composite code, will the selected MOD ($R_1, R_2, \ldots R_n$) reference composite code correlator provide a correlation peak.

When successful acquisition has been verified, the mode control 24 of the transmitting portion of the system 10 may be adjusted to select the MOD ($C_1, C_2, \ldots C_n$) composite code for transmission by the transmitter 30. This composite code may function as a carrier for the data to be impressed thereon via data input 28 to the modulator 26.

Since the receiving portion of the system 10 is now in proper alignment with the transmitting portion, the output of the last selected one of the correlators 34 may now be utilized to track the incoming signal. The data carried by the transmitted composite code, MOD ($C_1, C_2, \ldots C_n$), may be removed from the carrier by the data demodulator 53 for utilization in apparatus not shown.

MODIFICATIONS OF THE PRESENT INVENTION

Figure 2:
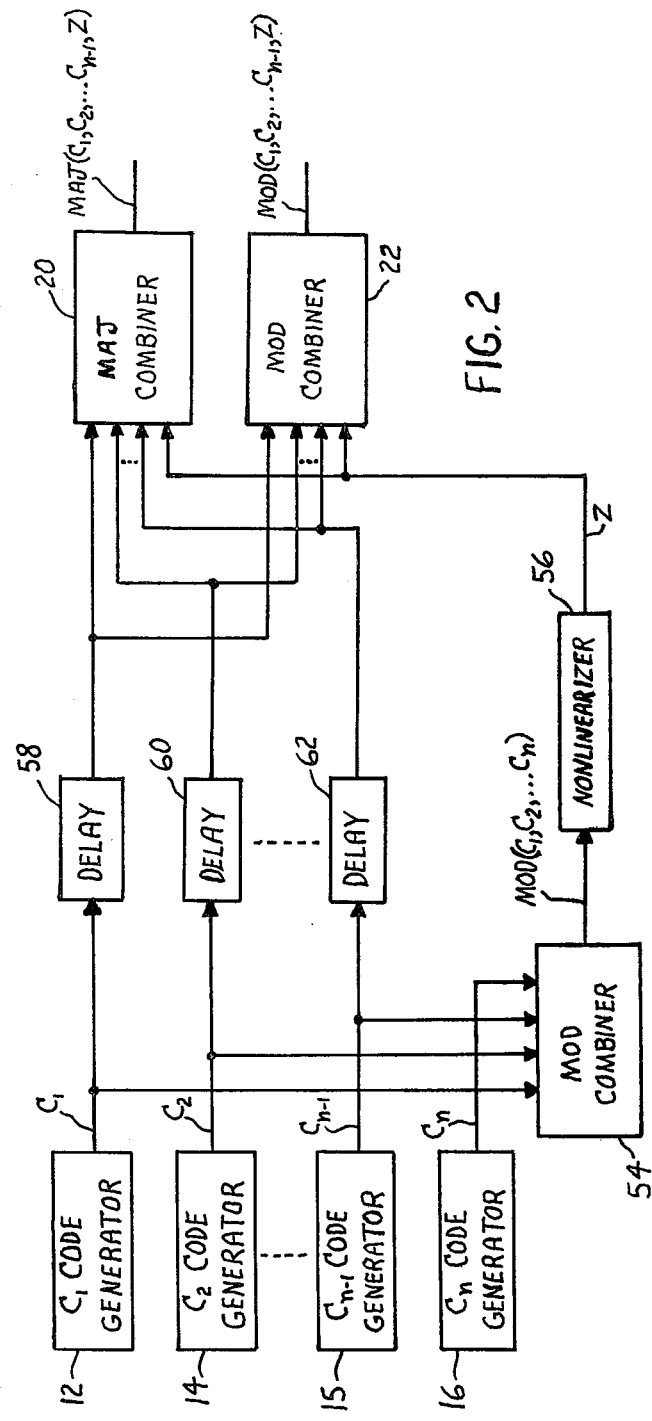
FIG. 2 is a block schematic diagram of the improvement provided by the present invention to the transmitting portion of the prior art system of FIG. 1.
Figure 3:
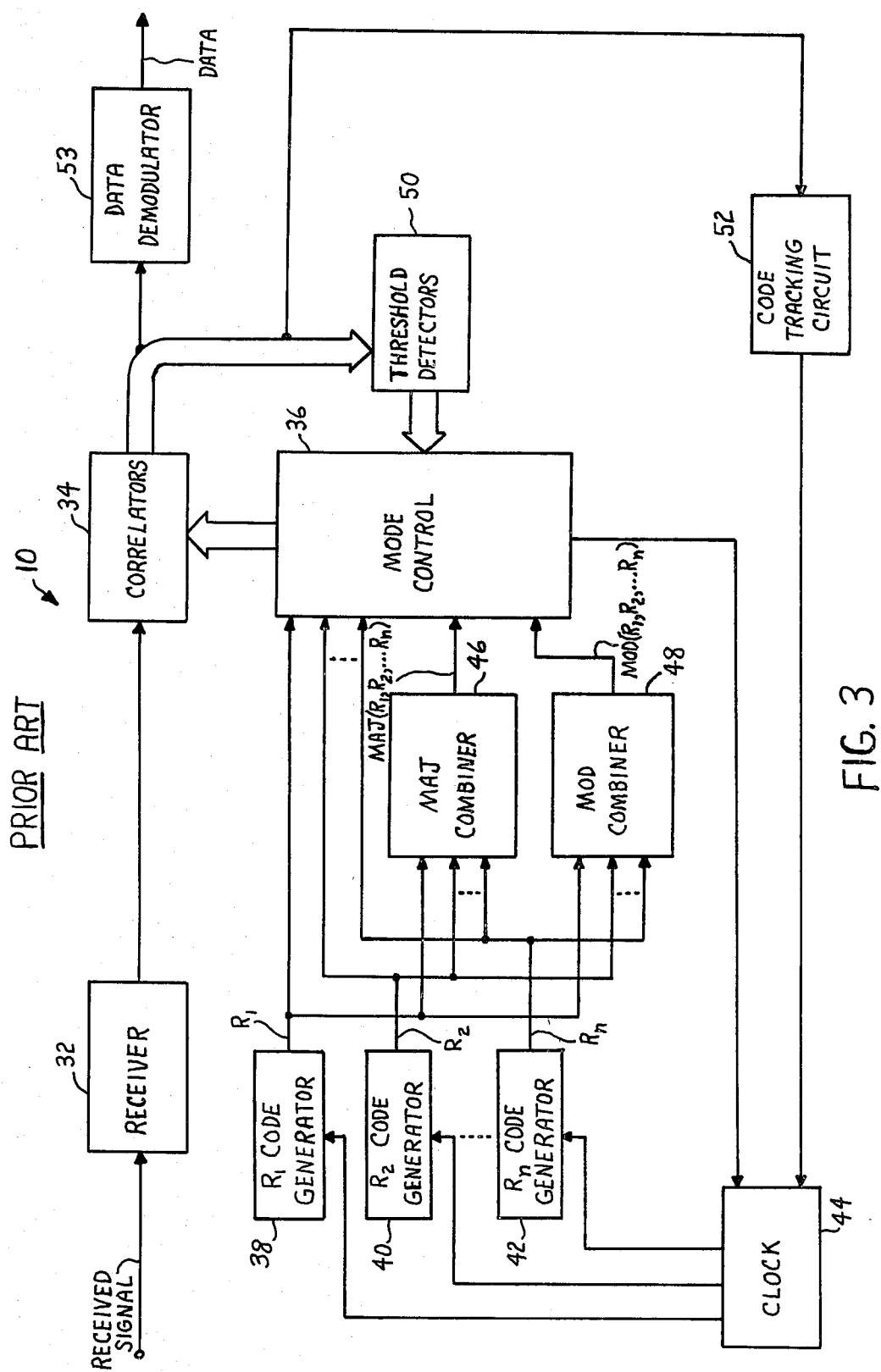
FIG. 3 is a block schematic diagram of the receiving portion of the prior art data communication system.

Referring now to FIG. 2, there are shown the modifications introduced by the present invention to the transmitting portion of the prior art data communication system 10. The modifications are incorporated between the component code generators 12, 14, 15, 16 and the MAJ and MOD combiners 20, 22 of the prior art system 10 and result in an improved technique for acquisition composite code generation wherein the security of the code is enhanced over that of the prior art system.

The modifications to the transmitting portion of the prior art system take the form of another MOD combiner 54, a nonlinearizer 56, and delays 58, 60, 62, which are all conventional components. The same basic composite codes, $C_1, C_2, \ldots C_n$, as utilized in the prior art system 10, are generated by component code generators 12, 14, 15, 16 in the initial step of the method of acquisition composite code generation employed by the improved system. However, the component codes are applied as inputs to the MOD combiner 54 which is connected to the nonlinearizer 56. The MOD combiner 54 combines the bits of the component codes in accordance with the modulo-2 addition rule to produce a linear composite code being substantially identical to the MOD composite code produced by the MOD combiner 22 of the prior art system 10 of FIG. 1.

The linear MOD composite code output of the MOD combiner 54 is applied as an input to the nonlinearizer 56. The nonlinearizer 56 may take any suitable form, such as an encrypter being set for operation in a decrypt mode. The nonlinearizer 56 is driven by the linear composite code, MOD ($C_1, C_2, \ldots C_n$) and produces a nonlinear composite code Z. The nonlinear composite code Z is applied to both the MAJ and MOD combiners 20, 22 of the prior art system.

Component codes, $C_1, C_2, \ldots C_{n-1}$, are also applied individually to MAJ and MOD combiners 20, 22. The identification of the code $C_{n-1}$ is for the purpose of indicating that all of the component codes, except for a single one of them, $C_n$, are applied to the MAJ and MOD combiners 20, 22 in the improved system, in contrast to the prior art system 10 of FIG. 1 wherein all of the component codes were applied thereto. Preferably, the codes, $C_1, C_2, \ldots C_{n-1}$, when applied to combiners 20, 22 are time delayed relative to these same codes incorporated by the nonlinear composite code Z. Such time delay for codes, $C_1, C_2, \ldots C_{n-1}$, may be brought about by delays 58, 60, 62. The purpose for the time delay is so that the portions of the component codes, $C_1, C_2, \ldots C_{n-1}$, incorporated in the nonlinear composite code Z will not be canceled out by the MAJ and MOD combining of the code Z with these same component codes.

The MAJ combiner 20 combines the bits of the linear time delayed component codes, $C_1, C_2, \ldots C_{n-1}$, and the nonlinear composite code, Z, in accordance with the conventional Boolean majority voting rule thereby providing a nonlinear composite code, MAJ $(C_1, C_2, \ldots C_{n-1}, Z)$ which may be utilized as the acquisition composite code in the improved system.

The MOD combiner 22 combines the bits of the linear time delayed component codes, $C_1, C_2, \ldots C_{n-1}$, and the nonlinear composite code, Z, in accordance with the conventional modulo-2 addition rule thereby providing a nonlinear composite code, MOD $(C_1, C_2, \ldots C_{n-1}, Z)$ which may be utilized as the data-carrying composite code in the improved system.

The nonlinear acquisition and data-carrying composite codes are applied as inputs to the mode control 24 of the prior art system and selected for transmission in the same manner as described above in the prior art system.

Figure 4:
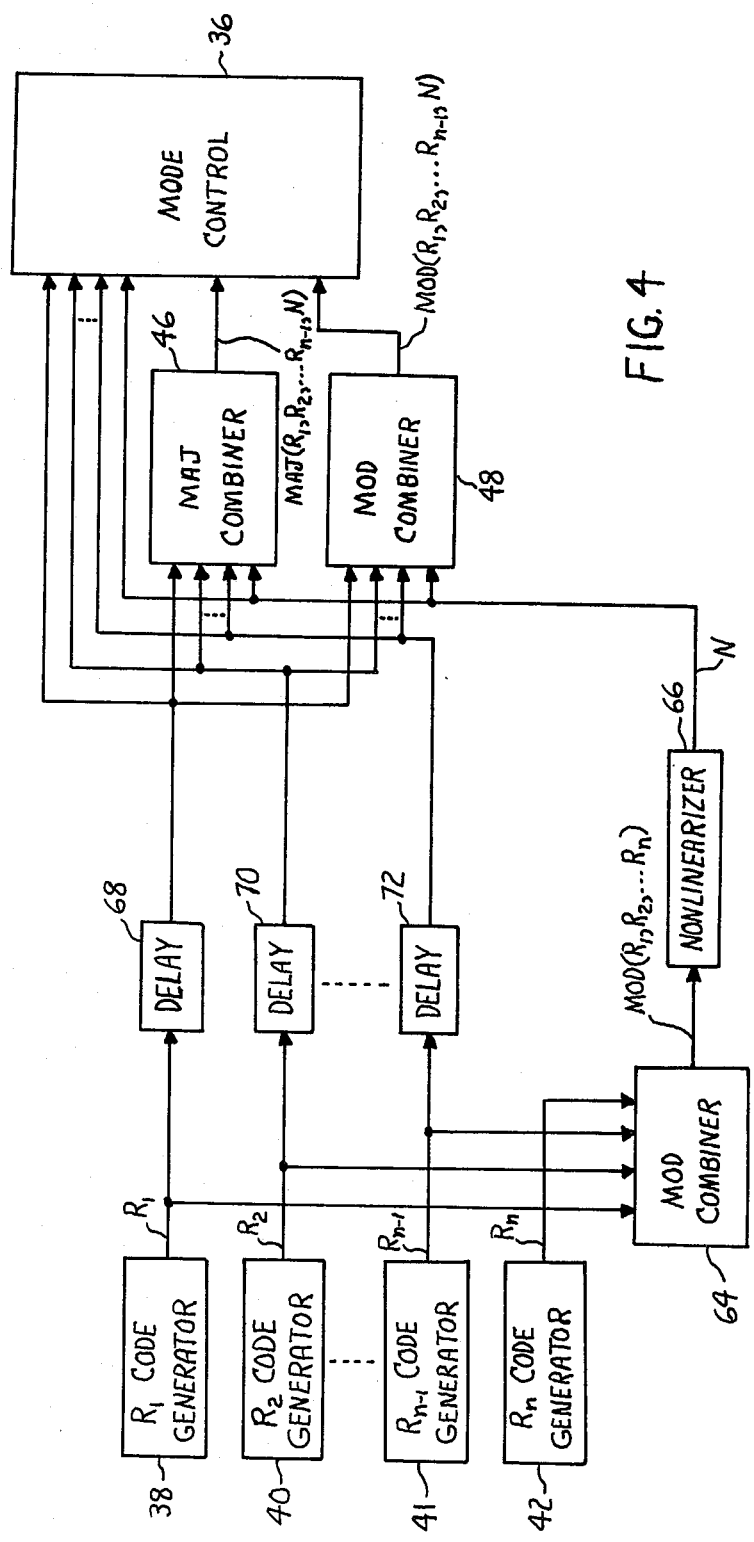
FIG. 4 is a block schematic diagram of the improvement provided by the present invention to the receiving portion of the prior art system of FIG. 3.

Turning now to FIG. 4, there is shown the modifications introduced by the present invention to the receiving portion of the prior art system 10. The modifications are incorporated between the reference component code generators 38, 40, 41, 42 and the MAJ and MOD combiners 46, 48 of the prior art system 10.

The modifications to the receiving portion of the prior art system, being identical to those made to the transmitting portion, take the form of a MOD combiner 64, a nonlinearizer 66, and delays 68, 70, 72. The same basic reference composite codes, $R_1, R_2, \ldots R_n$, as utilized in the prior art system of FIG. 3 are generated by reference component code generators 38, 40, 41, 42 and in the same manner as described hereinbefore with respect to the prior art system. The reference component codes are applied as inputs to the MOD combiner 64 which is connected to the nonlinearizer 66. The MOD combiner 64 combines the bits of the reference component codes in accordance with the modulo-2 addition rule to produce a linear reference composite code being substantially identical to the MOD reference composite code produced by the MOD combiner 48 of the prior art system 10 of FIG. 3.

The linear MOD reference composite code output of the MOD combiner 64 is applied as an input to the nonlinearizer 66. The nonlinearizer 66, being identical to that of the improved transmitting portion of the system, is driven by the linear reference composite code, MOD $(R_1, R_2, \ldots R_n)$, to produce a nonlinear reference composite code N, which is identical to code Z of the transmitting portion.

Component codes, $R_1, R_2, \ldots R_{n-1}$, or, in other words, all of the reference component codes with the exception of a single one, $R_n$, are also applied individually to the mode control 36, the MAJ combiner 46 and the MOD combiner 48. The nonlinear reference composite code N is also applied to the mode control 36, the MAJ combiner 46 and the MOD combiner 48. Preferably, the component codes, $R_1, R_2, \ldots R_{n-1}$, when applied to control 36 and combiners 46, 48 are time delayed by the same amount and for the same purpose that acquisition component codes, $C_1, C_2, \ldots C_{n-1}$, were time delayed in the transmitting portion of the improved system. Such time delay for codes, $R_1, R_2, \ldots R_{n-1}$, may be brought about by delays 68, 70, 72.

The linear reference component codes, $R_1, R_2, \ldots R_{n-1}$, and the nonlinear reference composite code N are combined in MAJ and MOD combiners 46 and 48 in a manner identical to that described with respect to FIG. 2, thus providing nonlinear composite codes, MAJ $(R_1, R_2, \ldots R_{n-1}, N)$ and MOD $(R_1, R_2, \ldots R_{n-1}, N)$, respectively. These latter MAJ and MOD codes are provided as inputs to the mode control 36, along with delayed component codes, $R_1, R_2, \ldots R_{n-1}$, and nonlinear reference composite code N.

The mode control 36 selects as its output one or more of the codes supplied at its inputs for serial or parallel application to the correlators 34 of the prior art system 10, in the same manner as described with respect to FIG. 3 for carrying out acquisition of the received acquisition code.

Briefly, when transmitted acquisition composite code, MAJ $(C_1, C_2, \ldots C_{n-1}, Z)$ is received, the mode control 36 selects one of the delayed reference codes, for example $R_1$, for application to a selected one of the correlators 34 for correlation matching with the received signal. The phase of reference component code $R_1$ is continuously swept past the received signal, MAJ $(C_1, C_2, \ldots C_{n-1}, Z)$, until the selected one of the correlators 34 indicates a correlation peak. The mode control 36, in response to the detected correlation peaks, stops the sweep of reference composite code $R_1$ and the correlation peak of the code $R_1$ with respect to the incoming or received signal is tracked. The remaining reference component codes, $R_2, \ldots R_{n-1}$, are similarly shifted until correlation with the received signal is obtained. Since alignment of reference component codes, $R_1, R_2, \ldots R_{n-1}$, has now been obtained with received signal, MAJ $(C_1, C_2, \ldots C_{n-1}, Z)$ correlation alignment of the nonlinear reference composite code N with the received signal may be achieved by shifting the phase of the remaining reference component code, $R_n$.

Verification of the successful acquisition of the nonlinear acquisition composite code, MAJ $(C_1, C_2, \ldots C_{n-1}, Z)$ is carried out, in the same manner as described with respect to the prior art system, by selecting the nonlinear composite code, MOD $(R_1, R_2, \ldots R_{n-1}, N)$ for correlating with the incoming signal, MAJ $(C_1, C_2, \ldots C_{n-1}, Z)$. Only if all of the reference component codes, $R_1, R_2, \ldots R_{n-1}$, and the reference composite code N are in proper alignment with the respective acquisition component codes, $C_1, C_2, \ldots C_{n-1}$, and composite code Z of the transmitted composite code, MAJ $(C_1, C_2, \ldots C_{n-1}, Z)$, will the seiected MOD $(R_1, R_2, \ldots R_{n-1}, N)$ composite code correlator provide a correlation peak.

When successful acquisition has been verified, the mode control 24 of the transmitting portion may be adjusted to select the MOD $(C_1, C_2, \ldots C_{n-1}, Z)$ composite code for transmission of data. Since the receiving portion of the system is now in proper alignment with the transmitting portion, the MOD $(R_1, R_2, \ldots R_{n-1}, N)$ composite code correlates with and may be used to track the incoming data-carrying signal MOD $(C_1, C_2, \ldots C_{n-1}, Z)$ in the same manner and for the same purpose as explained with respect to the prior art system.

In summary, the improved system of the present invention by utilizing the correlation properties of the prior art system retains its concomitant rapid acquisition capability since for acquisition of the transmitted nonlinear MAJ ($C_1, C_2, \ldots C_{n-1}, Z$) composite code, the total number of code bits required to be searched is still equal to the sum of the individual lengths of composite codes, $R_1, R_2, \ldots$ and $R_n$. At the same time, the security of the improved system from the threat of enemy analysis is increased dramatically over that of the prior art system through the nontransmission of the component code $C_n$, the time delay of the sequence of the component codes, $C_1, C_2, \ldots C_{n-1}$, which goes into the formation of the MAJ and MOD composite codes, and the nonlinearizing of the latter.

We claim:

1. A method of producing a code with enhanced acquisition security, comprising the steps of:
   generating a plurality of linear component codes, $C_1, C_2, \ldots C_n$;
   combining said linear component codes to form a linear first composite code in accordance with a first composition rule of such a character that said first composite code does not correlate with said component codes;
   nonlinearizing said first composite code to form a nonlinear second composite code; and
   combining said linear component codes, $C_1, C_2, \ldots C_{n-1}$, with said nonlinear second composite code to form a nonlinear acquisition composite code in accordance with a second composite rule of such a character that at least one of said component codes correlates with said acquisition composite code.

2. A method of producing a code with enhanced acquisition security, comprising the steps of:
   generating a plurality of linear component codes, $C_1, C_2, \ldots C_n$;
   combining said linear component codes to form a linear first composite code in accordance with a first composition rule of such a character that said first composite code does not correlate with said component codes;
   nonlinearizing said first composite code to form a nonlinear second composite code;
   time delaying said component codes, $C_1, C_2, \ldots C_{n-1}$; and
   combining said delayed codes, $C_1, C_2, \ldots C_{n-1}$, with said nonlinear second composite code to form a nonlinear acquisition composite code in accordance with a second composition rule of such a character that at least one of said delayed codes correlates with said acquisition composite code.

3. A method of producing a code with enhanced acquisition security, comprising the steps of:
   generating a plurality of linear component codes, $C_1, C_2, \ldots C_n$;
   combining said linear component codes in accordance with a modulo-2 addition rule to form a linear first composite code;
   nonlinearizing said first composite code by applying the same to an encrypter operating in a decrypt mode to form a nonlinear second composite code;
   time delaying said component codes, $C_1, C_2, \ldots C_{n-1}$; and
   combining said time delayed codes, $C_1, C_2, \ldots C_{n-1}$, with said nonlinear second composite code in accordance with a Boolean majority voting rule to form a nonlinear acquisition composite code.

4. A system for producing a code with enhanced acquisition security, comprising:
   means for generating a plurality of linear component codes, $C_1, C_2, \ldots C_n$;
   means for combining said linear component codes to form a linear first composite code in accordance with a first composition rule of such a character that said first composite code does not correlate with said component codes;
   means for nonlinearizing said first composite code to form a nonlinear second composite code; and
   means for combining said linear component codes, $C_1, C_2, \ldots C_{n-1}$, with said nonlinear second composite code to form a nonlinear acquisition composite code in accordance with a second composite rule of such a character that at least one of said component codes correlates with said acquisition composite code.

5. A system for producing a code with enhanced acquisition security, comprising:
   means for generating a plurality of linear component codes, $C_1, C_2, \ldots C_n$;
   means for combining said linear component codes to form a linear first composite code in accordance with a first composition rule of such a character that said first composite code does not correlate with said component codes;
   means for nonlinearizing said first composite code to form a nonlinear second composite code;
   means for time delaying said component codes, $C_1, C_2, \ldots C_{n-1}$; and
   means for combining said delayed codes, $C_1, C_2, \ldots C_{n-1}$, with said nonlinear second composite code to form a nonlinear acquisition composite code in accordance with a second composition rule of such a character that at least one of said delayed codes correlates with said acquisition composite code.

6. The system for producing a code as recited in claim 5, wherein:
   said first composition rule is a modulo-2 addition rule;
   said nonlinearizing means comprises an encrypter operating in a decrypt mode to which said first composite code is applied to form said nonlinear second composite code; and
   said second composition rule is a Boolean majority voting rule.

7. A coding method for communication between a transmitter and a receiver with enhanced security, comprising the steps of:
   (I) at the transmitter,
       (a) generating a plurality of linear acquisition component codes, $C_1, C_2, \ldots C_n$,
       (b) combining said acquisition component codes to form a linear first composite code in accordance with a first composition rule of such a character that said first composite code does not correlate with said component codes,
       (c) nonlinearizing said first composite code to form a nonlinear second composite code,
       (d) combining said linear component codes, $C_1, C_2, \ldots C_{n-1}$, with said nonlinear second composite code to form a nonlinear acquisition composite code in accordance with a second composition rule of such a character that at least one of said component codes correlates with said acquisition composite code, and
       (e) transmitting said nonlinear acquisition composite code; and (II) at the receiver,
- (a) receiving said nonlinear acquisition composite code,
- (b) generating a plurality of linear reference component codes, $R_1, R_2, \ldots R_n$, that correlate respectively with said linear acquisition component codes, $C_1, C_2, \ldots C_n$,
- (c) combining said reference component codes to form a linear third composite code in accordance with said first composition rule,
- (d) nonlinearizing said third composite code in a manner identical to that of said (I,c) nonlinearizing step to form a nonlinear fourth composite code,
- (e) correlating said reference component codes, $R_1, R_2, \ldots R_{n-1}$, with said nonlinear acquisition composite code by shifting the phases of said reference component codes, $R_1, R_2, \ldots R_{n-1}$, and
- (f) correlating said nonlinear fourth composite code with said nonlinear acquisition composite code by shifting the phase of the remaining reference component code, $R_n$.

8. The coding method as recited in claim 7, wherein:
said first composition rule is a modulo-2 addition rule; and
said second composition rule is a Boolean majority voting rule.

9. The coding method as recited in claim 7, wherein:
said (I,c) nonlinearizing step comprises applying said linear first composite code to an encrypter operating in a decrypt mode to form said nonlinear second composite code; and
said (II,d) nonlinearizing step comprises applying said linear third composite code to an encrypter operating in a decrypt mode to form said nonlinear fourth composite code.

10. The coding method as recited in claim 7, wherein:
said (I,d) combining step comprises time delaying said acquisition component codes, $C_1, C_2, \ldots C_{n-1}$, and combining said delayed codes with said nonlinear second composite code to form said nonlinear acquisition composite code in accordance with said second composition rule; and
said (II,e) correlating step comprises time delaying said reference component codes, $R_1, R_2, \ldots R_{n-1}$, by the same amount that said acquisition component codes, $C_1, C_2, \ldots C_{n-1}$, are time delayed and correlating said delayed reference component codes with said nonlinear acquisition composite code.

11. The coding method as recited in claim 7, further comprising the steps of:
(II) at the receiver,
- (g) combining said linear reference component codes, $R_1, R_2, \ldots R_{n-1}$, with said nonlinear fourth composite code in accordance with said first composition rule to form a nonlinear fifth reference composite code, and
- (h) correlating said nonlinear fifth composite code with said nonlinear acquisition composite code;

(I) at the transmitter,
- (f) combining said linear acquisition component codes, $C_1, C_2, \ldots C_{n-1}$, with said nonlinear second composite code in accordance with said first composition rule to form a nonlinear data-carrying composite code, and
- (g) transmitting said nonlinear data-carrying composite code; and (II) at the receiver,
- (i) receiving said nonlinear data-carrying composite code, and
- (j) correlating said nonlinear fifth reference composite code with said nonlinear data-carrying composite code.

12. The coding method as recited in claim 11, wherein:
said first composition rule is a modulo-2 addition rule; and
said second composition rule is a Boolean majority voting rule.

* * * * *